(12) United States Patent
Watanabe et al.

(10) Patent No.: US 9,163,110 B2
(45) Date of Patent: *Oct. 20, 2015

(54) GRANULE COATED WITH URETHANE RESIN

(75) Inventors: Atsushi Watanabe, Tokyo (JP); Yoshihiro Takebayashi, Toyonaka (JP); Toshiro Otsubo, Sanda (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 573 days.

This patent is subject to a terminal disclaimer.

(21) Appl. No.: 12/671,127

(22) PCT Filed: Aug. 13, 2007

(86) PCT No.: PCT/JP2007/066063
§ 371 (c)(1),
(2), (4) Date: Feb. 9, 2010

(87) PCT Pub. No.: WO2009/022431
PCT Pub. Date: Feb. 19, 2009

(65) Prior Publication Data
US 2010/0196431 A1   Aug. 5, 2010

(51) Int. Cl.
| C05G 3/00 | (2006.01) |
| C05G 5/00 | (2006.01) |
| C08G 18/76 | (2006.01) |
| A01N 25/26 | (2006.01) |
| C08G 18/66 | (2006.01) |

(52) U.S. Cl.
CPC ............ *C08G 18/664* (2013.01); *C05G 3/0029* (2013.01); *C08G 18/76* (2013.01)

(58) Field of Classification Search
None
See application file for complete search history.

(56) References Cited

U.S. PATENT DOCUMENTS

| 4,804,403 A * | 2/1989 | Moore ............................. 71/28 |
| 5,708,073 A | 1/1998 | Dodge et al. |
| 6,364,925 B1 * | 4/2002 | Markusch et al. ........... 71/64.07 |
| 6,503,288 B1 | 1/2003 | Markusch |
| 6,777,524 B1 * | 8/2004 | Shimizu et al. ................. 528/76 |
| 2002/0094444 A1 | 7/2002 | Nakata et al. |
| 2003/0040435 A1 | 2/2003 | Haberle et al. |
| 2007/0248592 A1 | 10/2007 | Okano et al. |

FOREIGN PATENT DOCUMENTS

| AU | 2007357740 B2 | 3/2013 |
| EP | 0399567 A2 | 11/1990 |
| EP | 1106635 A | 6/2001 |
| EP | 1264812 A2 | 11/2002 |
| JP | 07000505 A | 1/1995 |
| JP | 08003262 A | 1/1996 |
| JP | 2916762 B | 2/1998 |
| JP | 11130576 A | 5/1999 |
| JP | 2001213930 A | 8/2001 |
| JP | 200355079 A | 2/2003 |
| JP | 2003183104 A | 7/2003 |
| WO | 9829360 A1 | 7/1998 |

OTHER PUBLICATIONS

Office Action issued Aug. 3, 2012 in CN 200780100167.3.
Office Action issued Jul. 2, 2012 in AU2007357740.
Substantive Examination Clear Report issued Jun. 28, 2013 in MY Application No. PI 2010000068.
English translation of an Office action issued Sep. 5, 2013 in KR Application No. 10/2010/7005232.
Office Action issued Jan. 23, 2014 in EP Application No. 07 792 679.8.
Office Action issued on Nov. 17, 2014 in European Patent Application No. 07 792 679.8, 6 pages.
Office Action issued on Jun. 16, 2014 in European Patent Application No. 07 792 679.8, 4 pages.
Office Action issued on Jun. 4, 2013 in Chinese Patent Application No. 200780100167.3 and translation, 14 pages.
Office Action issued on Jun. 26, 2014 in Korean Patent Application No. 1020107005232 and translation, 11 pages.

* cited by examiner

*Primary Examiner* — Michael B Pallay
(74) *Attorney, Agent, or Firm* — Panitch Schwarze Belisario & Nadel LLP

(57) ABSTRACT

A coated granule is obtained by coating a bioactive substance-containing granule with a urethane resin obtained by reaction of an aromatic diisocyanate with a polyol mixture containing a polyesterpolyol and a C2-C8 polymethylene glycol, wherein the molar ratio of the polyesterpolyol to the polymethylene glycol is 1:20 to 20:1. The granule is capable of controlling elution of the bioactive substance appropriately, and the urethane resin forming the coating film shows degradability in soil.

25 Claims, No Drawings

GRANULE COATED WITH URETHANE RESIN

CROSS-REFERENCE TO RELATED APPLICATION

This application is a section 371 of International Application No. PCT/JP2007/066063, filed Aug. 13, 2007, which was published in the English language on Feb. 19, 2009 under International Publication No. WO 2009/022431 A1 and the disclosure of which is incorporated herein by reference.

TECHNICAL FIELD

The present invention relates to a granule coated with a urethane resin.

BACKGROUND TECHNOLOGY

There is suggested a technology of coating a bioactive ingredient for fertilizers, pesticides and the like with a coat film, thereby controlling elution appropriately, so as to cause elution thereof at given period according to the growth of plants.

Recently, enhanced attention is paid to easily degradable resins for thoughtful consideration for the environment. JP 11-130576A and JP 7-505B disclose granules coated with polycaprolactone and polyethylene or the like. With coated granules of fertilizers, however, it is difficult to control elution using an easily degradable resin as a coat film so as to elute a fertilizer component at given period.

SUMMARY OF THE INVENTION

According to the present invention, with a coated granule of a bioactive substance, use of a urethane resin obtained by reacting an aromatic diisocyanate with a polyol mixture comprising a polyesterpolyol and a C2-C8 polymethylene glycol, wherein the molar ratio of the polyesterpolyol to the polymethylene glycol is 1:20 to 20:1.

That is, the present invention includes the following inventions.

[Invention 1]
A coated granule obtained by coating a bioactive substance-containing granule with a urethane resin obtained by reaction of an aromatic diisocyanate with a polyol mixture comprising a polyesterpolyol and a C2-C8 polymethylene glycol, wherein the molar ratio of the polyesterpolyol to the polymethylene glycol is 1:20 to 20:1. The molar ratio of the polyesterpolyol to the polymethylene glycol means a ratio of the number of the hydroxyl group of the polyesterpolyol to the number of the hydroxyl group of the polymethylene glycol throughout the description.

[Invention 2]
The coated granule described in Invention 1, wherein the polyesterpolyol has 15 wt % or more of an oxycarbonyl structure (—O—C(=O)—) part in the molecule.

[Invention 3]
The coated granule described in Invention 1 or 2, wherein the amount of the polyesterpolyol is 15 to 80 parts by weight based on 100 parts by weight of the total amount of the aromatic diisocyanate and the polyol.

[Invention 4]
The coated granule described in any one of Inventions 1 to 3, wherein the polyesterpolyol is polycaprolactonepolyol.

[Invention 5]
The coated granule described in Invention 4, wherein the amount of the polycaprolactonepolyol is 20 to 70 parts by weight based on 100 parts by weight of the total amount of the aromatic diisocyanate and the polyol.

[Invention 6]
The coated granule described in any one of Inventions 1 to 5, wherein the amount of the polymethylene glycol is 1 to 25 parts by weight based on 100 parts by weight of the total amount of the aromatic diisocyanate and the polyol.

[Invention 7]
The coated granule described in any one of Inventions 1 to 6, wherein the polymethylene glycol is 1,4-butandiol or 1,6-hexanediol.

[Invention 8]
The coated granule described in any one of Inventions 1 to 7, wherein the amount of the aromatic diisocyanate is 10 to 49 parts by weight based on 100 parts by weight of the total amount of the aromatic diisocyanate and the polyol.

[Invention 9]
The coated granule described in any one of Inventions 1 to 8, wherein the aromatic diisocyanate is 4,4'-diphenylmethanediisocyanate.

[Invention 10]
The coated granule described in Invention 1, wherein the polyol comprises polyesterdiol, C2-C8 polymethylene glycol and triol.

[Invention 11]
The coated granule described in Invention 10, wherein the amounts of the polyesterdiol, C2-C8 polymethylene glycol, triol and aromatic diisocyanate are 20 to 55 parts, 1 to 15 parts, 10 to 40 parts and 10 to 49 parts by weight, respectively, based on 100 parts by weight of the total amount of the aromatic diisocyanate and the polyol.

[Invention 12]
The coated granule described in Invention 1, wherein the polyol comprises polycaprolactonepolyol, C2-C8 polymethylene glycol and at least one selected from the group consisting of castor oil and hydrogenated castor oil.

[Invention 13]
The coated granule described in Invention 12, wherein the amounts of the polycaprolactonepolyol, C2-C8 polymethylene glycol, castor oil and/or hydrogenated castor oil and aromatic diisocyanate are 20 to 55 parts, 1 to 15 parts, 10 to 40 parts and 10 to 49 parts by weight, respectively, based on 100 parts by weight of the total amount of the aromatic diisocyanate and the polyol.

[Invention 14]
The coated granule described in any one of Inventions 1 to 13, wherein the bioactive substance is a fertilizer.

[Invention 15]
The coated granule described in any one of Inventions 1 to 13, wherein the bioactive substance is a pesticide. de

DETAILED DESCRIPTION OF THE PREFERRED EMBODIMENT

According to the present invention, the coated granule containing a bioactive substance is coated with a resin easily degradable in soil and shows excellent elution controllability of the bioactive substance.

The urethane resin used as a film for providing the coated granular material of the present invention is a urethane resin obtained by reaction of an aromatic diisocyanate with a polyol mixture comprising a polyesterpolyol and a C2-C8 polymethylene glycol. The molar ratio of the polyesterpolyol to the polymethylene glycol is 1:20 to 20:1.

The polyesterpolyol is preferably a polyesterpolyol having 15 wt % or more of an oxycarbonyl structure (—O—C(=O)—) part in the molecule.

The polyesterpolyol is generally polylactonepolyol, which means a compound produced by ring-opening-polymerizing a lactone monomer with a low molecular weight polyol. Examples of the lactone monomer include β-propiolactone, γ-butyrolactone, δ-valerolactone and ε-caprolactone. Examples of the low molecular weight polyol include divalent alcohol such as ethylene glycol, diethylene glycol, propylene glycol, 1,4-butanediol, 1,5-pentanediol, 1,6-hexanediol and 1,8-octanediol; and trivalent alcohol such as 2-ethyl-2-(hydroxymethyl)-1,3-propanediol(trimethylolpropane), 2-(hydroxymethyl)-1,3-propanediol, glycerin and triethanolamine.

Preferable polyesterpolyol is polycaprolactonepolyol, which is a compound produced by ring-opening-polymerizing an ε-caprolactone monomer with the above-mentioned low molecular weight polyol. Typical chemical structures of the polycaprolactonepolyol(polycaprolactonediol or polycaprolactonetriol) having two or three hydroxyl groups in one molecule are shown below. This polycaprolactonepolyol is a polyol having at least one (1-oxohexa-1,6-diyl)oxy structure (—C(=O)—CH$_2$—CH$_2$—CH$_2$—CH$_2$—CH$_2$—O—) in one molecule.

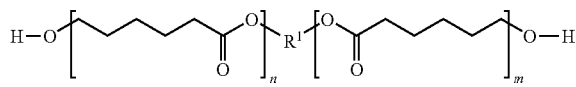

[wherein, m represents an integer of 0 or more, n represents an integer of 1 or more and m+n is 2 or more, and R$^1$ represents a divalent organic group (for example, ethylene group, tetramethylene group and the like)].

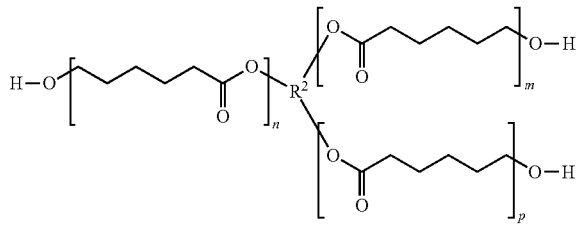

[wherein, m and p represent an integer of 0 or more, n represents an integer of 1 or more and m+n+p is 2 or more, and R$^2$ represents a trivalent organic group (for example, propane-1,2,3-triyl group and the like)].

For example, a polycaprolactonepolyol produced by ring-opening-polymerizing 6 moles of ε-caprolactone with one mole of ethylene glycol has the following formula:

HO—[CH$_2$—CH$_2$—CH$_2$—CH$_2$—CH$_2$—C(=O)—O]$_3$—CH$_2$—CH$_2$—[O—C(=O)—CH$_2$—CH$_2$—CH$_2$—CH$_2$—CH$_2$]$_3$—OH

The polycaprolactonepolyol has about 35 wt % of an oxycarbonyl structure (—O—C(=O)—) part in the molecule, namely,

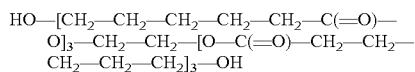

wherein, each molecular weight of ε-caprolactone and ethylene glycol is 114 and 62, respectively, and the oxycarbonyl structure has 44 of the molecular weight.

Further, the equivalent weight of the hydroxyl group to the polycaprolactonepolyol is 373, namely, (62+114×6)/2=373 wherein, the molecular weight of the ε-caprolactone is divided by the number of the hydroxyl group.

The molecular weight of the polycaprolactonepolyol is preferably 300 to 5000, more preferably 400 to 2500. Further, the equivalent weight of the hydroxyl group to the polycaprolactonepolyol is usually 200 to 1250.

The amount of the polyesterpolyol is usually 15 to 80 parts by weight, preferably 20 to 70 parts by weight, based on 100 parts by weight of the total amount of the aromatic diisocyanate and the polyol.

Examples of the C2-C8 polymethylene glycol include ethylene glycol, 1,3-propanediol, 1,4-butanediol, 1,5-pentanediol, 1,6-hexanediol and 1,8-octanediol. Among them, 1,4-butanediol and 1,6-hexanediol are preferable. The amount of the polymethylene glycol is usually 1 to 25 parts by weight based on 100 parts by weight of the total amount of the aromatic diisocyanate and the polyol.

Examples of the aromatic diisocyanate include diisocyanate compounds having one or two benzene rings such as 4,4'-diphenylmethane diisocyanate (MDI), tolylene diisocyanate (TDI), xylylene diisocyanate (XDI), tolidine diisocyanate (TODI) and tetramethylenexylylene diisocyanate (TMXDI); and diisocyanate compounds having a naphthalene ring such as naphthalene 1,5-diisocyanate (NDI). Prepolymer such as a reaction product of the above-mentioned aromatic diisocyanate with a polyol may be used as the aromatic diisocyanate. Among them, MDI is preferable. The amount of the aromatic diisocyanate is usually 10 to 49 parts by weight based on 100 parts by weight of the total amount of the aromatic diisocyanate and the polyol.

In an embodiment of the present invention, the polyol mixture for providing the urethane resin comprises a polyesterdiol (e.g., polycaprolactonediol), a C2-C8 polymethylene glycol and a triol (e.g., polycaprolactonetriol, castor oil, hydrogenated castor oil). The amounts of the polyesterdiol, C2-C8 polymethylene glycol, triol and aromatic diisocyanate are usually 20 to 55 parts, 1 to 15 parts, 10 to 40 parts and 10 to 49 parts by weight, respectively.

In an embodiment of the present invention, the polyol mixture for providing the urethane resin comprises a polycaprolactonepolyol and a C2-C8 polymethylene glycol, and at least one selected from the group consisting of castor oil and hydrogenated (hardened) castor oil. The amounts of the polycaprolactonepolyol, C2-C8 polymethylene glycol, castor oil and/or hydrogenated castor oil and aromatic diisocyanate are usually 20 to 55 parts, 1 to 15 parts, 10 to 40 parts and 10 to 49 parts by weight, respectively.

In the present invention, the molar ratio of the isocyanate (NCO) group in the aromatic diisocyanate to the hydroxyl (OH) group in the polyol mixture is generally 1:0.9-1:1.5, preferably 1:1-1:1.2.

The urethane resin is produced usually by reacting an aromatic diisocyanate and a polyol, if necessary in the presence of a catalyst, on the surface of a bioactive substance-containing granule or on a coat film covering a bioactive substance-containing granule.

The reaction of an aromatic diisocyanate and a polyol is not particularly restricted, and can be carried out by, for example, a method in which all aromatic diisocyanates and polyols are mixed and hardened, a method in which an aromatic diisocyanates and a part of polyols are mixed previously to prepare a polyisocyanate-terminal prepolymer, then, remaining polyols are mixed and hardened, and other, methods. Further, it is also possible that a small amount of organic solvent is mixed with a diisocyanate and a polyol, and a solvent is removed simultaneously with the reaction. The reaction conditions thereof can be selected arbitrarily, however, when the temperature is raised, the reaction speed of a hydroxyl group and an isocyanate group increases. By adding a catalyst, the reaction speed can be accelerated.

Examples of the catalyst to be used for production of a urethane resin include organometal compounds such as potassium acetate, calcium acetate, stannous octoate, dibutyltin diacetate, dibutyltin dichloride, dibutyltin dilaurate, dibutinthiostannic acid, stannous octylate, di-n-octyltin dilaurate, isopropyl titanate, bismuth 2-ethyl hexanoate, phosphine, zinc neodecanoate, tetrabutyl titanate, oxyisopropyl vanadate, n-propyl zirconate and the like, and amine catalysts such as triethylamine, N,N,N',N'-tetramethylethylenediamine, triethylenediamine, N-methylmorpholine, N,N-dimethyldidodecylamine, N-dodecylmorpholine, N,N-dimethylcyclohexylamine, N-ethylmorpholine, dimethylethanolamine, N,N-dimethylbenzylamine, 2,4,6-tris(dimethylaminomethyl)phenol and the like.

A mixture having flowability of an aromatic diisocyanate and a polyol (further, catalyst to be added if necessary), before sufficient reaction of a diisocyanate group in the aromatic diisocyanate and a hydroxyl group in the polyol, is expressed as an unhardened urethane resin in some cases.

The coated granule of the present invention is a coated granule obtained by coating a bioactive substance-containing granule with a urethane resin, and the coat using a urethane resin suppresses elution of a bioactive substance in the bioactive substance-containing granule. In the present invention, mentioned as the bioactive substance contained in the bioactive substance-containing granule are insecticides, fungicides, herbicides, plant growth regulating agents, repellents, fertilizers and the like.

Examples of the pesticidal ingredient for insecticides, fungicides, herbicides, plant growth regulating agents, repellents and the like include organophosphorus compounds such as fenitrothion [O,O-dimethyl O-(3-methyl-4-nitrophenyl) phosphorothioate], fenthion[O,O-dimethyl O-(3-methyl-4-(methylyhio)phenyl)phosphorothioate], diazinon [O,O-diethyl O-2-isopropyl-6-methylpyrimidin-4-yl phosphorothioate], chlorpyrifos[O,O-diethyl O-3,5,6-trichloro-2-pyridyl phosphorothioate], acephate[O,S-dimethyl acetylphosphoramidothioate], methidathion [S -2,3-dihydro-5-methoxy-2-oxo-1,3,4-thiadiazol-3-ylmethyl O,O-dimethyl phosphorodithioate], disulfoton[O,O-diethyl S-2-ethylthioethyl phosphorodithioate], DDVP[2,2-dichlorovinyl dimethylphosphate], sulprofos[O-ethyl O-4-(methylyhio)phenyl S-propylphosphorodithioate], cyanophos[O-4-cyanophenyl O-dimethyl phosphorothioate], dioxabenzofos [2-methoxy-4H -1,3,2-benzodioxaphosphorine-2-sulfide], dimethoate [O,O-dimethyl S-(N-methylcarbamoylmethyl)dithiophosphate], phenthoate [ethyl 2-dimethoxyphosphinothioyl(phenyl)acetate], malathion[diethyl (dimethoxyphosphinothioylthio)succinate], trichlorfon [dimethyl 2,2,2-trichloro-1-hydroxyethylphosphonate], azinphos-methyl[S-3,4-dihydro-4-oxo-1,2,3-benzotriazin-3-ylmethyl O,O-dimethyl phosphorodithioate], monocrotophos[dimethyl (E)-1-methyl-2-(methylcarbamoyl)vinyl phosphate] and ethion [O,O,O',O'-tetraethyl S,S'-methylenebis (phosphorodithioate)]; carbamate compounds such as BPMC[2-sec-butylphenyl methylcarbamate], benfuracarb [ethyl N-{2,3-dihydro-2,2-dimethylbenzofuran-7-yloxycarbonyl(methyl)aminothio}-N-isopropyl-β-alaninate], propoxur[2-isopropoxyphenyl N-methylcarbamate], carbosulfan[2,3-dihydro-2,2-dimethyl-7-benzo[b]furanyl N-dibutylaminothio-N-methylcarbamate], carbaryl[1-naphthyl N-methylcarbamate], methomyl[S-methyl-N-(methylcarbamoyloxy)thioacetimidate], ethiofencarb[2-(ethylthiomethyl)phenyl methylcarbamate], aldicarb[2-methyl-2-(methylthio)propionaldehyde O-methylcarbamoyl oxime], oxamyl[N,N-dimethyl-2-methylcarbamoyloxyimino-2-(methylthio)acetamide] and fenothiocarb[S-4-phenoxybutyl N,N-dimethylthiocarbamate]; pyrethroid compounds such as etofenprox[2-(4-ethoxyphenyl)-2-methyl-1-(3-phenoxybenzyl)oxypropane], fenvalerate[(RS)-α-cyano-(3-phenoxybenzyl) (RS)-2-(4-chlorophenyl)-3-methylbutyrate], esfenvalerate[(S)-α-cyano-(3-phenoxybenzyl) (S)-2-(4-chlorophenyl)-3-methylbutyrate], fenpropathrin[(RS)-α-cyano-(3-phenoxybenzyl) 2,2,3,3-tetramethylcyclopropanecarboxylate], cypermethrin[(RS)-α-cyano-(3-phenoxybenzyl) (1RS)-cis,trans-3-(2,2-dichlorovinyl)-2,2-dimethylcyclopropanecarboxylate], permethrin[3-phenoxybenzyl(1RS)-cis,trans-3-(2,2-dichlorovinyl)-2,2-dimethylcyclopropanecarboxylate], cyhalothrin [(RS)-α-cyano-(3-phenoxybenzyl) (1RS,3Z)-cis-3-(2-chloro-3,3,3-trifluoroprop-1-enyl)-2,2-dimethylcyclopropanecarboxylate], deltamethrin[(S)-α-cyano-3--phenoxybenzyl (1R)-cis-3-(2,2-dibromovinyl)-2,2-dimethylcyclopropanecarboxylate], cycloprothrin[(RS)-α-cyano-3-phenoxybenzyl (RS)-2,2-dichlorovinyl-1-(4-ethoxyphenyl) cyclopropanecarboxylate], fluvalinate [α-cyano-3-phenoxybenzyl N-(2-chloro-α,α,α-trifluoro-p-tolyl)-D-valinate], biphenthrin [2-methyl-3--phenylbenzyl (1RS,3Z)-cis-3-(2-chloro-3,3,3-trifluoro-1-propenyl)-2,2-dimethylcyclopropanecarboxylate], halfenprox [2-(4-bromodifluoromethoxyphenyl)-2-methyl-1-(3-phenoxybenzyl) methylpropane], tralomethrin [(S)-α-cyano-3--phenoxybenzyl (1R)-cis-3-(1,2,2,2-tetrabromoethyl)-2,2--dimethylcyclopropanecarboxylate], silafluofen [(4-ethoxyphenyl)-{3-(4-fluoro-3-phenoxyphenyl)propyl}dimethylsilane], d-phenothrin [3--phenoxybenzyl (1R)-cis,trans-2,2-dimethyl-3-(2-methyl-1-propenyl) cyclopropanecarboxylate], cyphenothrin [(RS)-α-cyano-3-phenoxybenzyl (1R)-cis,trans-2,2-dimethyl-3-(2-methyl-1-propenyl) cyclopropanecarboxylate], d-resmethrin [5-benzyl-3--furylmethyl (1R)-cis,trans-2,2-dimethyl-3-(2-methyl-1-propenyl) cyclopropanecarboxylate], acrinathrin [(S)-α-cyano-3-phenoxybenzyl (1R,3Z)-cis-2,2-dimethyl-3-{3-oxo-(1,1,1,3,3,3-hexafluoropropyloxy) propenyl}cyclopropanecarboxylate], cyfluthrin [(RS)-α-cyano-4-fluoro-3-phenoxybenzyl 3-(2,2-dichlorovinyl)-2,2-dimethylcyclopropanecarboxylate], tefluthrin [2,3,5,6-tetrafluoro-4-methylbenzyl (1RS,3Z)-cis-3-(2-chloro-3,3,3-trifluoro-1-propenyl)-2,2-dimethylcyclopropanecarboxylate], transfluthrin [2,3,5,6-tetrafluorobenzyl (1R)-trans-3-(2,2-dichlorovinyl)-2,2-dimethylcyclopropanecarboxylate], tetramethrin [3,4,5,6-tetrahydrophthalimidomethyl (1RS)-cis,trans-2,2-dimethyl-3-(2-methyl-1-propenyl)cyclopropanecarboxylate], allethrin [(RS)-2-methyl-4-oxo-3-(2-propenyl)-2-cyclopenten-1-yl (1RS)-cis,trans-2,2-dimethyl-3-(2-methyl-1-propenyl)cyclopropanecarboxylate], prallethrin[(S)-2-methyl-4-oxo-3-(2-propynyl)-2-cyclopenten-1-yl (1R)-cis,trans-2,2-dimethyl-3-(2-methyl-1-propenyl)cyclopropanecarboxylate], empenthrin[(RS)-1-ethynyl-2-methyl-2-pentenyl (1R)-cis,trans-2,2-dimethyl-3-(2-methyl-1-propenyl)cyclopropanecarboxylate], imiprothrin [2,5-dioxo-3-(2-propynyl)imidazolidin-1-ylmethyl (1R)-cis,trans -2,2-dimethyl-3-(2-methyl-1-propenyl)cyclopropanecarboxylate], d-furamethrin [5-(2-propynyl)furfuryl (1R)-cis, trans-2,2-dimethyl-3-(2-methyl-1-propenyl) cyclopropanecarboxylate] and 5-(2-propynyl)furfuryl 2,2,3,3-tetramethylcyclopropanecarboxylate; thiadiazine derivatives such as buprofezin [2-tert-butylimino-3-isopropyl-5-phenyl-1,3,5-thiadiazin-4-one]; nitroimidazolidine derivatives; nereistoxin derivatives such as cartap [S,S'-(2-dimethylaminotrimethyl)bis(thiocarbamate)], thiocyclam [N,N-dimethyl-1,2,3-trithian-5-ylamine] and bensultap [S,S'-2-dimethylaminotrimethylenedi (benzenethiosulfonate); N-cyanoamidine derivatives such as N-cyano-N'-methyl-N'-(6-chloro-3-pyridylmethyl) acetamidine; chlorinated hydrocarbon compounds such as endosulfan [6,7,8,9,10,10-hexachloro-1,5,5a,6,9,9a-hexahydro-6,9-methano-2,4,3-benzodioxathiepine oxide], γ-BHC[1,2,3,4,5,6-hexachlorocyclohexane] and dicofol [1,1-bis(4-chlorophenyl)-2,2,2-trichloroethanol]; benzoylphenylurea compounds such as chlorfluazuron [1-{3,5-dichloro-4-(3-chloro-5-trifluoromethylpyridin-2-yloxy) phenyl}-3-(2,6-difluorobenzoyl)urea], teflubenzuron [1-(3,5-dichloro-2,4-difluorophenyl)-3-(2,6-difluorobenzoyl) urea] and flufenoxuron [1-{4-(2-chloro-4-trifluoromethylphenoxy)-2-fluorophenyl}-3-(2,6-difluorobenzoyl)urea]; formamidine derivatives such as amitraz [N,N-{(methylimino)dimethylidine}-di-2,4-xylidine] and chlorodimeform [N'-(4-chloro -2-methylphenyl)-N,N-dimethylmethinimidamide]; thiourea derivatives such as diafenthiuron[N-(2,6-diisopropyl-4-phenoxyphenyl)-N'-t-butylcarbodiimide]; N-phenylpyrazole compounds; metoxadiazon [5-methoxy-3-(2-methoxyphenyl)-1,3,4-oxadiazol-2(3H)-one]; bromopropylate [isopropyl 4,4'-dibromobenzilate]; tetradifon [4-chlorophenyl 2,4,5-trichlorophenyl sulfone]; chinomethionat [S,S -6-methylquinoxaline-2,3-diyldithiocarbonate]; propargite [2-(4-tert-butylphenoxy)cyclohexylprop-2-yl sulfite]; fenbutatin oxide [bis{tris(2-methyl-2-phenylpropyl)tin}oxide]; hexythiazox [(4RS,5RS)-5-(4-chlorophenyl)-N-chlorohexyl-4-methyl-2-oxo-1,3-thiazolidine-3-carboxamide]; clofentezine [3,6-bis(2-chlorophenyl)-1,2,4,5-tetrazine]; pyridaben [2-tert-butyl-5-(4-tert-butylbenzylthio)-4-chloropyridazin-3(2H)-one]; fenpyroximate [tert-butyl (E)-4-[(1,3-dimethyl-5-phenoxypyrazol-4-yl) methyleneaminooxymethyl]benzoate]; tebufenpyrad [N-4-tert-butylbenzyl]-4-chloro-3-ethyl-1-methyl-5-pyrazolcarboxamide]; polynactin complex [tetranactin, dinactin, trinactin]; pyrimidifen [5-chloro-N-[2-{4-(2-ethoxyethyl)-2,3-dimethylphenoxy}ethyl]-6-ethylpyrimidine-4-amine]; milbemectin; abamectin, ivermectin; azadirachtin [AZAD]; 5-methyl [1,2,4]triazolo[3,4-b]benzothiazol; methyl 1-(butylcarbaraoyl)benzimidazol-2-carbamate; 6-(3,5-dichloro-4-methylphenyl)-3(2H)-pyridazinone; 1-(4-chlorophenoxy)-3,3-dimethyl-1-(1H-1,2,4-triazol-1-yl)butanone; (E)-4-chloro-2-(trifluoromethyl)-N-[1-(imidazol-1-yl)-2-propoxyethylidene]aniline; 1-[N-propyl-N-[2-(2,4,6-trichlorophenoxy)ethyl]carbamoyl]imidazole; (E)-1-(4-chlorophenyl)-4,4-dimethyl-2-(1H-1,2,4-triazol-1-yl)-1-penten-3-ol; 1-(4-chlorophenyl)-4,4-dimethyl-2-(1H-1,2,4-triazol-1-yl)pentan-3-ol; (E)-1-(2,4-dichlorophenyl)-4,4-dimethyl-2-(1H-1,2,4-triazol-1-yl)penten-3-ol; 1-(2,4-dichlorophenyl)-4,4-dimethyl-2-(1H-1,2,4-triazol-1-yl) pentan-3-ol; 4-[3-(4-tert-butylphenyl)-2-methylpropyl]-2,6-dimethylmorpholine; 2-(2,4-dichlorophenyl)-1-(1H-1,2,4-triazol-1-yl)hexan-2-ol; O,O-diethyl O-2-quinoxalinyl phosphorothioate; O-(6-ethoxy-2-ethyl-4-pyromidinyl) O,O-dimethyl phosphorothioate; 2-diethylamino-5,6-dimethylpyrimidin-4-yl dimethylcarbamate; 4-(2,4-dichlorobenzoyl)-1,3-dimethyl-5-pyrazolyl p-toluenesulfonate; 4-amino-6-(1,1-dimethylethyl)-3-methylthio-1,2,4-triazin-5 (4H)-one, 2-chloro-N-[(4-methoxy-6-methyl-1,3,5-triazin-2-yl) aminocarbonyl] benzenesulfonamide; 2-methoxycarbonyl-N-[(4,6-dimethoxypyrimidin-2-yl)aminocarbonyl] benzenesulfonamide; 2-methoxycarbonyl-N-[(4,6-dimethylpyrimidin-2-yl)aminocarbonyl] benzenesulfonamide; 2-methoxycarbonyl-N-[(4-methoxy-6-methyl-1,3,5-triazin-2-yl)aminocarbonyl] benzenesulfonamide; 2-ethoxycarbonyl-N-[(4-chloro-6-methoxypyrimidin-2-yl)aminocarbonyl] benzenesulfonamide; 2-(2-chloroethoxy)-N-[(4-methoxy-6-methyl-1,3,5-triazin-2-yl)aminocarbonyl] benzenesulfonamide; 2-methoxycarbonyl-N-[(4,6-dimethoxypyrimidin-2-yl) aminocarbonyl] phenylmethanesulfonamide; 2-methoxycarbonyl-N-[(4-methoxy-6-methyl-1,3,5-triazin-2-yl)aminocarbonyl] thiophene-3-sulfonamide; 4-ethoxycarbonyl-N-[(4,6-dimethoxypyrimidin-2-yl) aminocarbonyl]-1-methylpyrazole-5-sulfonamide; 2-[4,5-dihydro-4-methyl-4-(1-methylethyl)-5-oxo-1H-imidazol-2-yl]-3-quinolinecarboxylic acid; 2-[4,5-dihydro-4-methyl-4-(1-methylethyl)-5-oxo-1H-imidazol-2-yl]-5-ethyl-3-pyridinecarboxylic acid; methyl 6-(4-isopropyl-4-methyl-5-oxoimidazolin-2-yl)-m-toluate; methyl 2-(4-isopropyl-4-methyl-5-oxoimidazolin-2-yl)-p-toluate; 2-(4-isopropyl-4-methyl-5-oxoimidazolin-2-yl) nicotinic acid; N-(4-chlorophenyl)methyl-N-cyclopentyl-N'-phenylurea; (RS)-2-cyano-N-[(R)-1-(2,4-dichlorophenyl)ethyl]-3,3-dimethylbutyramide; N-(1,3-dihydro-1,1,3-trimethylisobenzofuran-4-yl)-5-chloro-1,3-dimethylpyrazole-4-carboxamide; N-[2,6-dibrobo-4-(trifluoromethoxy) phenyl]-2-methyl-4-(trifluoromethyl)-5-thiazolecarboxamide; 2,2-dichloro-N-[1-(4-chlorophenyl) ethyl]-3-methylcyclopropanecarboxamide; methyl (E)-2-2-6-(2-cyanophenoxy)pyrimidin-4-yloxy-phenyl-3-methoxyacrylate; 5-methyl-1,2,4-triazolo[3,4-b] benzothiazole; 3-allyloxy-1,2-benzisothiazole-1,1-dioxide; diisopropyl 1,3-dithiolan-2-ylidenemalonate and O,O-dipropyl O-4-methylthio phosphate.

The fertilizer in the present invention is a component containing various elements such as nitrogen, phosphorus, potassium, silicon, magnesium, calcium, manganese, boron, iron and the like to be applied to soil for imparting nutrients in plant cultivation, and examples thereof include nitrogen fertilizer components such as urea, ammonium nitrate, magnesium ammonium nitrate, ammonium chloride, ammonium sulfate, ammonium phosphate, sodium nitrate, calcium nitrate, potassium nitrate, lime nitrogen, formaldehyde-condensed urea (UF), acetaldehyde-condensed urea (CDU), isobutylaldehyde-condensed urea (IBDU) and guanyl urea (GU); phosphoric acid fertilizer components such as calcium superphosphate, triple superphosphate of lime, fused phosphorus, humus phosphorus, calcined phosphorus, sintered phosphorus, magnesiun superphosphate, ammonium polyphosphate, potassium metaphosphate, calcium metaphosphate, magnesium phosphate, ammonium sulfate phosphate, ammonium potassium phosphate nitrate, ammonium hydrochloride phosphate and the like; potassium fertilizer components such as potassium chloride, potassium sulfate, potassium sodium sulfate, potassium magnesia sulfate, potassium bicarbonate, potassium phosphate and the like; silic acid fertilizer components such as calcium silicate and the like; magnesia fertilizer components such as magnesium sulfate, magnesium chloride and the like; calcium fertilized components such as calcium oxide, calcium hydroxide, calcium carbonate and the like; manganese fertilizer components such as manganese sulfate, magnesia manganese sulfate, slag manganese and the like; boron fertilizer components such as boric acid, borate and the like; iron-containing fertilizer components such as steel slag and the like.

The bioactive substance-containing granule in the present invention may be a bioactive substance itself, or a material supporting a bioactive substance on a carrier. The bioactive substance-containing granule may contain various kinds of bioactive substances. The coated granule of the present invention may contain several bioactive substance-containing granules as an inner core simultaneously.

Examples of the carrier supporting a bioactive substance include kaolin minerals such as kaolinite and the like; mineral carriers such as montmorillonite, smectite, talc, agalmatolite, hydrous calcium silicate, calcium carbonate, zeolite, terra alba and the like; plant carriers such as cellulose, husk, starch, soybean powder and the like; water-soluble carries such as lactose, sucrose, dextrin, sodium chloride, sodium tripolyphosphate, and the like, and these carries can be used appropriately in combination.

In the present invention, mentioned as the bioactive substance-containing granule are pesticidal granules containing pesticidal active compounds such as insecticides, fungicides, herbicides, plant growth regulating agents, repellents and the like; granular fertilizers; pesticide-containing granular fertilizers containing fertilizers and pesticidal active ingredients, and the like.

As the coated granule of the present invention, the following embodiments are exemplified.

A coated granule obtained by coating a bioactive substance-containing granule with a urethane resin obtained by reacting 10 to 49 parts by weight of an aromatic diisocyanate with a polyol containing 15 to 80 parts by weight of a polyesterpolyol and 1 to 25 parts by weight of a C2-C8 polymethylene glycol.

A coated granule obtained by coating a bioactive substance-containing granule with a urethane resin obtained by reacting 10 to 49 parts by weight of MDI with a polyol containing 15 to 80 parts by weight of a polyesterpolyol and 1 to 25 parts by weight of a C2-C8 polymethylene glycol.

A coated granule obtained by coating a bioactive substance-containing granule with a urethane resin obtained by reacting 10 to 49 parts by weight of an aromatic diisocyanate with a polyol containing 15 to 80 parts by weight of polycaprolactonepolyol and 1 to 25 parts by weight of a C2-C8 polymethylene glycol.

A coated granule obtained by coating a bioactive substance-containing granule with a urethane resin obtained by reacting 10 to 49 parts by weight of MDI with a polyol containing 15 to 80 parts by weight of polycaprolactonepolyol and 1 to 25 parts by weight of a C2-C8 polymethylene glycol.

A coated granule obtained by coating a bioactive substance-containing granule with a urethane resin obtained by reacting 10 to 49 parts by weight of an aromatic diisocyanate consisting essentially of MDI with a polyol containing 15 to 80 parts by weight of polycaprolactonepolyol having 300-5000 of a molecular weight and 1 to 25 parts by weight of a C2-C8 polymethylene glycol.

A coated granule obtained by coating a bioactive substance-containing granule with a urethane resin obtained by reacting MDI with a polyol mixture of polycaprolactonediol having 300-5000 of a molecular weight and a C2-C8 polymethylene glycol.

A coated granule obtained by coating a bioactive substance-containing granule with a urethane resin obtained by reacting MDI with a polyol mixture of polycaprolactonediol having 300-5000 of a molecular weight, polycaprolactonetriol having 300-5000 of a molecular weight and a C2-C8 polymethylene glycol.

A coated granule obtained by coating a bioactive substance-containing granule with a urethane resin obtained by reacting MDI with a polyol mixture of polycaprolactonetriol having 300-5000 of a molecular weight and a C2-C8 polymethylene glycol.

A coated granule obtained by coating a bioactive substance-containing granule with a urethane resin obtained by reacting MDI with a polyol mixture of polycaprolactonediol having 300-5000 of a molecular weight, polyoxypropylenetriol and a C2-C8 polymethylene glycol.

A coated granule obtained by coating a bioactive substance-containing granule with a urethane resin obtained by reacting MDI with a polyol mixture of polycaprolactonediol having 300-5000 of a molecular weight, castor oil and a C2-C8 polymethylene glycol.

A coated granule obtained by coating a bioactive substance-containing granule with a urethane resin obtained by reacting MDI with a polyol mixture of polycaprolactonediol having 300-5000 of a molecular weight, polycaprolactonetriol having 300-5000 of a molecular weight and a C2-C8 polymethylene glycol, wherein the crosslinking density is within a range between 0.02 and 0.07.

The crosslinking density can be defined as below.

Crosslinking density=(wt % of the triol in the polyol having 300-5000 of a molecular weight)/(number average molecular weight of the triol)

When the polyol contains two or more triols, the crosslinking density is a sum of each crosslinking density.

A coated granule obtained by coating a bioactive substance-containing granule with a urethane resin obtained by reacting MDI with a polyol mixture of polycaprolactonetriol having 300-5000 of a molecular weight and a C2-C8 polymethylene glycol, wherein the crosslinking density is within a range between 0.02 and 0.07.

A coated granule obtained by coating a bioactive substance-containing granule with a urethane resin obtained by reacting MDI with a polyol mixture of polycaprolactonediol having 300-5000 of a molecular weight, polyoxypropylenetriol and a C2-C8 polymethylene glycol, wherein the crosslinking density is within a range between 0.02 and 0.07.

A coated granule obtained by coating a bioactive substance-containing granule with a urethane resin obtained by reacting MDI with a polyol mixture of polycaprolactonediol having 300-5000 of a molecular weight, castor oil and a C2-C8 polymethylene glycol, wherein the crosslinking density is within a range between 0.02 and 0.07.

A coated fertilizer granule obtained by coating a fertilizer granule with a urethane resin obtained by reacting MDI with a polyol mixture of polycaprolactonediol having 300-5000 of a molecular weight and a C2-C8 polymethylene glycol.

A coated fertilizer granule obtained by coating a fertilizer granule with a urethane resin obtained by reacting MDI with a polyol mixture of polycaprolactonediol having 300-5000 of a molecular weight, polycaprolactonetriol having 300-5000 of a molecular weight and a C2-C8 polymethylene glycol.

A coated fertilizer granule obtained by coating a fertilizer granule with a urethane resin obtained by reacting MDI with a polyol mixture of polycaprolactonetriol having 300-5000 of a molecular weight and a C2-C8 polymethylene glycol.

A coated fertilizer granule obtained by coating a fertilizer granule with a urethane resin obtained by reacting MDI with a polyol mixture of polycaprolactonediol having 300-5000 of a molecular weight, polyoxypropylenetriol and a C2-C8 polymethylene glycol.

A coated fertilizer granule obtained by coating a fertilizer granule with a urethane resin obtained by reacting MDI with a polyol mixture of polycaprolactonediol having 300-5000 of a molecular weight, castor oil and a C2-C8 polymethylene glycol.

A coated pesticide granule obtained by coating a pesticide granule with a urethane resin obtained by reacting MDI with a polyol mixture of polycaprolactonediol having 300-5000 of a molecular weight and a C2-C8 polymethylene glycol.

A coated pesticide granule obtained by coating a pesticide granule with a urethane resin obtained by reacting MDI with a polyol mixture of polycaprolactonediol having 300-5000 of a molecular weight, polycaprolactonetriol having 300-5000 of a molecular weight and a C2-C8 polymethylene glycol.

A coated pesticide granule obtained by coating a pesticide granule with a urethane resin obtained by reacting MDI with a polyol mixture of polycaprolactonetriol having 300-5000 of a molecular weight and a C2-C8 polymethylene glycol.

A coated pesticide granule obtained by coating a pesticide granule with a urethane resin obtained by reacting MDI with a polyol mixture of polycaprolactonediol having 300-5000 of a molecular weight, polyoxypropylenetriol and a C2-C8 polymethylene glycol.

A coated pesticide granule obtained by coating a pesticide granule with a urethane resin obtained by reacting MDI with a polyol mixture of polycaprolactonediol having 300-5000 of a molecular weight, castor oil and a C2-C8 polymethylene glycol.

The coated granule of the present invention can be produced by forming a coat made of the above-mentioned urethane resin around a bioactive substance-containing granule, and the coating method is not particularly restricted. There are mentioned, for example, (1) a method in which a solution or emulsion of a urethane resin prepared separately is sprayed around a bioactive substance-containing granule, then, a solvent is removed to attain coating; (2) a method in which an aromatic diisocyanate and a polyol are added simultaneously to a bioactive substance-containing granule, and on the surface of the bioactive substance-containing granule, a urethane resin is prepared to attain coating; (3) a method in which an aromatic diisocyanate and a polyol are added sequentially to a bioactive substance-containing granule, and on the surface of the bioactive substance-containing granule, a urethane resin is prepared to attain coating; and other methods.

An embodiment in the method (2) is a procedure of preparing a mixture of all the polyols and optionally a catalyst, mixing it with the aromatic diisocyanate just before adding to the bioactive substance-containing granule, and then adding the resulting mixture to the bioactive substance-containing granule under fluidizing or tumbling condition.

Examples of the embodiments in the method (3) include a procedure of preparing a mixture of all the polyols in advance, adding the mixture and the aromatic diisocyanate by turns to the bioactive substance-containing granule under fluidizing or tumbling condition; a procedure of adding the aromatic diisocyanate, polyesterpolyol and C2-C8 polymethylene glycol, subsequently, to the bioactive substance-containing granule under fluidizing or tumbling condition; and a procedure of adding the polyesterpolyol, aromatic diisocyanate and C2-C8 polymethylene glycol, subsequently, to the bioactive substance-containing granule under fluidizing or tumbling condition.

The reaction temperature of the aromatic diisocyanate with polyol is usually 20 to 200° C., preferably 50 to 150° C.

Desired elution suppressing ability can be obtained even if the use amount of a resin used for coating is smaller providing a coat film in the coated granule of the present invention is uniform. Thus, it is preferable that the urethane resin is produced by reacting the aromatic diisocyanate and the polyol under the condition without solvent on the surface of a granular material containing a bioactive substance.

Examples of the coated granule of the present invention used for applications in the agricultural field include coated granular fertilizers, coated pesticidal granules, solid pesticidal microcapsules, solid pesticidal microspheres and the like.

In obtaining the coated granule of the present invention, coating can be performed without using a solvent in resin molding, if an unhardened urethane resin has suitable flowability for a suitable period at temperatures in producing a urethane resin.

In the coated granule of the present invention, it is preferable that a urethane resin has a hydrophobic liquid compound having a boiling point of 100° C. or higher from the standpoint of bioactive substance elution suppressing ability. The hydrophobic liquid compound is usually immersed in a urethane resin or supported on its surface. The hydrophobic liquid compound is liquid at 20° C., and examples thereof include aliphatic hydrocarbons such as liquid paraffin, aromatic hydrocarbons such as phenylxylylethane, distyrylxylene, alkylbenzene (Solvesso 150; trade name of Exxon-Mobile Chemical), fatty acid ester compounds such as vegetable oils (e.g., soybean oil, cottonseed oil).

In the coated granule of the present invention, it is preferable that the above-mentioned hydrophobic liquid compound is contained in an amount of 0.1 to 5 wt % in the coated granular material of the present invention, and in general, it is preferable that the hydrophobic liquid compound is added in an amount to an extent of slight presence of the hydrophobic liquid compound on the surface of the core granule.

The method for producing a coated granule of the present invention will be illustrated in more detail referring to a method for producing a coated granular fertilizer as an example.

Particles of a granular fertilizer are made into fluidizing condition or tumbling condition in an apparatus such as a jet flow apparatus, rolling pan, rolling drum and the like. The size of the particle is not particularly restricted, and usually 0.1 to 15mm, and its shape is preferably sphere, and may also be other configuration such as cylinder and the like. The particles under fluidizing or tumbling condition are, if necessary, heated. Next, an unhardened urethane resin as a mixture of an aromatic diisocyanate, a polyol and, a catalyst to be added if necessary, is added to the particle under fluidizing or tumbling condition. The addition method may be either a method of mixing components before quick addition, or a method of adding components separately. Thereafter, while maintaining the fluidizing or tumbling condition of the particles, the reaction of an isocyanate group in the aromatic diisocyanate and a hydroxyl group in the polyol is progressed, thereby, the surface of the particle is coated with a urethane resin. It is preferable to control the amount of the urethane resin to be added so that the thickness of a coat film formed in this one operation is usually 1 to 100 μm. Further, when larger thickness of a coat film is necessary, the thickness of a urethane resin coat film can be increased by repeating the above-mentioned operation.

In the coated granule of the present invention, the thickness of an urethane resin coat film is usually 1 to 600 μm, preferably 8 to 400 μm, and the amount thereof is usually 1 to 20 wt % (based on coated granular material of the present invention), preferably 2 to 16 wt %.

The particle size of the coated granule of the present invention is usually in the range of 0.1 to 15 mm.

When a urethane resin has a hydrophobic liquid compound, the coated granular fertilizer of the present invention can be produced by a method in which a hydrophobic liquid compound is added to the granular fertilizer simultaneously with an unhardened urethane resin, a method in which a hydrophobic liquid compound is added to the granular fertilizer before coating with a urethane resin, a method in which a hydrophobic liquid compound is added, after coating with a urethane resin, to the granular fertilizer coated with a urethane resin, and the like, in the above-mentioned method for producing a coated granular fertilizer, and preferably, produced by a method in which a hydrophobic liquid compound is added to the granular fertilizer before coating with a urethane resin.

EXAMPLES

The present invention will be illustrated in more detailed by production examples and test examples mentioned later, but the present invention is not limited to only examples.

Reference Example 1

(Production of Urethane Resin Film)

A urethane resin film was produced under the following conditions.

Polyols described in Tables 1 and 2 were melted at 50° C. and mixed uniformly with 2,4,6-tris(dimethylaminomethyl) phenol(catalyst), and then, an aromatic diisocyanate (melted at 50° C.) was added, mixed quickly and drawn into a sheet using an applicator set at a thickness of about 125 μm. The drawn resin was allowed to stand at 70° C. for 3 hours to cause hardening, obtaining urethane resin films (A) to (F) and films (a) and (b) for references.

TABLE 1

| | Name of Compound | A | B | C | Ref. b |
|---|---|---|---|---|---|
| Diisocyanate | MDI (NCO equivalent: 125) | 36.7 | 41.1 | 39.8 | 41.1 |
| Polyol | Ethylene glycol (OH equivalent: 31) | 5.5 | | | |
| | 1,4-Butanediol (OH equivalent: 45) | | 10.4 | | |
| | 1,6-Hexanediol (OH equivalent: 59) | | | 13.2 | |
| | Trimethylolpropane (OH equivalent: 44.7) | | | | 10.3 |
| | Polycaprolactonediol A (OH equivalent: 492) | 57.8 | 48.5 | 47.0 | 48.6 |
| Catalyst | 2,4,6-Tris(dimethylaminomethyl)phenol | 0.05 | 0.05 | 0.05 | 0.05 |
| | Total Amount (wt %) | 100.05 | 100.05 | 100.05 | 100.05 |

TABLE 2

| | Name of Compound | D | E | F | Ref. a |
|---|---|---|---|---|---|
| Diisocyanate | MDI (NCO equivalent: 125) | 46.0 | 33.5 | 28.4 | |
| | Polymethylenepolyphenylene polyisocyanate (NCO equivalent: 136) | | | | 30.1 |
| Polyol | 1,4-Butanediol (OH equivalent: 45) | 11.6 | 4.8 | 2.0 | 2.0 |
| | Polycaprolactonediol B (OH equivalent: 416) | 23.0 | 33.5 | 37.8 | 36.8 |
| | Castor oil (OH equivalent: 351) | 19.4 | 28.2 | 31.9 | 31.1 |
| Catalyst | 2,4,6-Tris(dimethylaminomethyl)phenol | 0.05 | 0.05 | 0.05 | 0.05 |
| | Total Amount (wt %) | 100.05 | 100.05 | 100.05 | 100.05 |
| | Crosslinking density | 0.04 | 0.04 | 0.04 | |

In Tables 1 and 2 described above,
MDI (Sumidur 44S, manufactured by Sumika Beyer Urethane K.K.),
polymethylenepolyphenylene polyisocyanate (Sumidur 44V-10, manufactured by Sumika Beyer Urethane K.K.),
ethylene glycol (manufactured by Wako Pure Chemical Industries, Ltd.),
1,4-butanediol (manufactured by Wako Pure Chemical Industries, Ltd.),
1,6-hexanediol (manufactured by Wako Pure Chemical Industries, Ltd.),
polycaprolactonediol A (Placcel 210, manufactured by Daicel Chemical Industries, Ltd.),
polycaprolactonediol B (Placcel 208, manufactured by Daicel Chemical Industries, Ltd.),
castor oil (Castor Oil No. 1 for industrial use, manufactured by Hokoku Corporation) and
2,4,6-tris(dimethylaminomethyl)phenol (TAP, manufactured by Kayaku Akzo Corporation) were used.

Test Example 1

(Degradation of Urethane Resin Film in Soil)

Films (A), (B), (D), (E), (F), (a) and (b) were cut into a size of 20 mm×20 mm and buried in soil obtained from the field in Hyogo prefecture (clay loam having a moisture content of 25.9%) and preserved at 28° C. During preservation, moisture was refilled appropriately in the soil and kept constant. Three months after, the films were recovered, washed with water, and dried, then, reduction rate in weight of the film was measured. The results are given in Table 3.

TABLE 3

| Film | Reduction in soil after 3 months (%) |
|---|---|
| A | 4.2 |
| B | 3.4 |
| D | 4.8 |
| E | 4.0 |
| F | 19.6 |
| a | 2.1 |
| b | 0.6 |

Production Example 1

Under conditions described later, coated granular fertilizers were produced by coating granular urea (large granular urea, particle size: about 3 mm, number of granule per gram: 60) with urethane resins of raw material compositions (A)-(D), (F) and (a) described in Tables 1 and 2.

In a rotary vessel, 1000 parts by weight of granular urea was made into tumbling condition, and the granular urea was heated up to about 70° C. by hot air. Next, 15 parts by weight of liquid paraffin was added and tumbling thereof was continued for 10 minutes. Further, 5 parts by weight of an unhardened urethane resin having the composition described in Tables 1 and 2 was added and kept the tumbling condition under heating for 3 minutes or more. Further, addition of the unhardened urethane resin and keeping of the tumbling condition under heating were repeated until the total amount of the unhardened urethane resin added reached 100 parts by weight. Thereafter, the mixture was cooled down to around room temperature, to obtain coated granular ureas (A)-(D), (F) and (a). The unhardened urethane resin was obtained by mixing a polyol described in Tables 1 and 2 (melted at 50° C.) and 2,4,6-tris(dimethylaminomethyl)phenol (catalyst) uniformly, then, adding an aromatic diisocyanate (melted at 50° C.) directly before addition, and mixing them quickly.

Production Example 2

Under conditions described later, coated granular fertilizers were produced by coating granular urea (large granular urea, particle size: about 3 mm, number of granule per gram: 60) with urethane resins of raw material composition (E) described in Table 2.

In a rotary vessel, 1000 parts by weight of granular urea was made into tumbling condition, and the granular urea was heated up to about 70° C. by hot air. Next, 20 parts by weight of an unhardened urethane resin having the composition (E) described in Table 2 was added and kept the tumbling condition under heating for 8 minutes or more. Further, addition of the unhardened urethane resin and keeping of the tumbling condition under heating were repeated until the total amount of the unhardened urethane resin added reached 100 parts by weight. Thereafter, the mixture was cooled down to around room temperature, to obtain coated granular urea (E).

Test Example 2

(Test of Elution Property of Urea in Coated Granular Fertilizer)

7.5 g of the coated granular fertilizer obtained in Production Examples 1 and 2 was placed in a 100 ml glass tube, 100 ml of ion-exchanged water was added thereto and the mixture was allowed to stand still at 25° C. After given time, a small amount of the mixture was sampled, and the urea content eluted from the coated fertilizer was measured. The results are given in Table 4.

TABLE 4

| Coated granular fertilizer | Elution ratio after 35 days (%) |
|---|---|
| Coated granular urea (A) | 42 |
| Coated granular urea (B) | 40 |
| Coated granular urea (D) | 33 |
| Coated granular urea (E) | 17 |
| Coated granular urea (F) | 12 |
| Coated granular urea (a) | 61 |
| Coated granular urea (b) | 44 |

Production Example 3

The same procedures as Production example 1, except that using urethane resins of raw material compositions (G)-(K) described in Table 5, gave coated granular ureas (G)-(K).

Production Example 4

The same procedures as Production example 1, except that using urethane resins of raw material compositions (L), (M), (P) and (Q) described in Table 6, gave coated granular ureas (L), (M), (P) and (Q).

Further, the same procedures as Production example 1, except that 10 parts by weight of an unhardened urethane resin of raw material compositions (N) and (O) described in Table 6 were added per one procedure and that the tumbling condition was kept under heating for 5 minutes or more, gave coated granular ureas (N) and (O).

TABLE 5

| | Name of Compound | G | H | I | J | K |
|---|---|---|---|---|---|---|
| Diisocyanate | MDI (NCO equivalent: 125) | 32.9 | 34.1 | 34.1 | 31.8 | 30.1 |
| Polyol | 1,4-Butanediol (OH equivalent: 45) | 4.7 | 4.9 | | 6.3 | 4.3 |
| | 1,6-Hexanediol (OH equivalent: 59) | | | 11.3 | | |
| | Polycaprolactonediol B (OH equivalent: 416) | 43.9 | 22.7 | | 23.8 | 40.2 |

TABLE 5-continued

|  | Name of Compound | G | H | I | J | K |
|---|---|---|---|---|---|---|
|  | Polycaprolactonetriol C (OH equivalent: 668) |  |  | 54.6 | 38.1 |  |
|  | Castor oil (OH equivalent: 351) | 18.5 | 38.3 |  |  | 25.4 |
| Catalyst | 2,4,6-Tris(dimethylaminomethyl)phenol | 0.05 | 0.05 | 0.05 | 0.05 | 0.05 |
|  | Total Amount (wt %) | 100.05 | 100.05 | 100.05 | 100.05 | 100.05 |
|  | Crosslinking density | 0.03 | 0.06 | 0.03 | 0.04 | 0.04 |

TABLE 6

|  | Name of Compound | L | M | N | O | P | Q |
|---|---|---|---|---|---|---|---|
| Diisocyanate | MDI (NCO equivalent: 125) | 33.5 | 33.1 | 40.9 | 40.9 | 40.1 | 41.8 |
| Polyol | 1,4-Butanediol (OH equivalent: 45) | 4.8 | 6.0 | 11.5 | 10.6 | 8.7 | 9.0 |
|  | Polycaprolactonediol B (OH equivalent: 416) |  |  |  | 20.4 | 40.0 | 13.9 |
|  | Polycaprolactonediol D (OH equivalent: 265) | 17.0 |  |  |  |  |  |
|  | Polycaprolactonediol E (OH equivalent: 1002) | 16.5 |  |  |  |  |  |
|  | Polycaprolactonetriol C (OH equivalent: 668) |  | 33.0 | 47.5 | 28.0 |  |  |
|  | Castor oil (OH equivalent: 351) | 28.2 | 27.9 |  |  | 11.3 | 35.2 |
| Catalyst | 2,4,6-Tris(dimethylaminomethyl)phenol | 0.05 | 0.05 |  |  | 0.01 | 0.01 |
|  | Total Amount (wt %) | 100.05 | 100.05 | 100.00 | 100.00 | 100.01 | 100.01 |

In Tables 5 and 6 described above,
MDI (Sumidur 44S, manufactured by Sumika Beyer Urethane K.K.),
1,4-butanediol (manufactured by Wako Pure Chemical Industries, Ltd.),
1,6-hexanediol (manufactured by Wako Pure Chemical Industries, Ltd.),
polycaprolactonediol B (Placcel 208, manufactured by Daicel Chemical Industries, Ltd.),
polycaprolactonetriol C (Placcel 320, manufactured by Daicel Chemical Industries, Ltd.),
polycaprolactonediol D (Placcel 205, manufactured by Daicel Chemical Industries, Ltd.),
polycaprolactonediol E (Placcel 220, manufactured by Daicel Chemical Industries, Ltd.),
castor oil (Castor Oil No. 1 for industrial use, manufactured by Hokoku corporation) and
2,4,6-tris(dimethylaminomethyl)phenol (TAP, manufactured by Kayaku Akzo Corporation) were used.

Test Example 3

(Test of Elution Property of Urea in Coated Granular Fertilizer)

The same procedures as Test example 2 for the coated granular ureas (G)-(I), (K)-(N) and (P)-(Q) were conducted to measure the elution ratio.

The results are given in Table 7.

TABLE 7

| Coated granular fertilizer | Elution ratio after 35 days (%) |
|---|---|
| Coated granular urea (G) | 35 |
| Coated granular urea (H) | Nearly 0 |
| Coated granular urea (I) | 18 |
| Coated granular urea (K) | 19 |
| Coated granular urea (L) | 3 |
| Coated granular urea (M) | 10 |
| Coated granular urea (N) | 14 |
| Coated granular urea (P) | 46 |
| Coated granular urea (Q) | 48 |

Reference Example 2

(Production of Urethane Resin Film)

A urethane resin film (L) or (M) was produced by the same procedures as Reference Example 1.

Test Example 3

(Degradation of Urethane Resin Film in Soil)

The same tests were conducted as Test example 1 by using the urethane resin film (L) and (M). The results are given in Table 8.

TABLE 8

| Film | Reduction in soil after 3 months (%) |
|---|---|
| L | 10.8 |
| M | 8.7 |

Production Example 6

Eight (8) parts by weight of N-(1,1,3-trimethyl-2-oxa-4-indanyl)-5-chloro-1,3-dimethylpyrazole-4-carboxamide, 1.6 parts by weight of hydrous silicon dioxide (TOKUSEAL GU-N, manufactured by Tokuyama Soda Co., Ltd.) and 8 parts by weight of bentonite (BENTONITE FUJI, manufactured by Hojun Kogyo K.K.) were mixed sufficiently, then, pulverized by a jet mill. 17.6 parts by weight of the pulverized material obtained above, 3 parts by weight of polyvinyl alcohol (mixture of 2.5 parts by weight of GOHSENOL GL-05 (manufactured by Nippon Synthetic Chemical Industry Co., Ltd.) and 0.5 parts by weight of PVA 217S (manufactured by Kuraray Co., Ltd.)), 12 parts by weight of bentonite (BENTONITE FUJI, manufactured by Hojun Kogyo K.K.), 2 parts by weight of polyoxyethylene styryl phenyl ether (SOLPOL T-20, manufactured by Toho Chemical Industry Co., Ltd.) and 50.4 parts by weight of a calcium carbonate powder (TANCAL NN200, manufactured by Nitto Funka Kogyo K.K.) were mixed sufficiently in a juice mixer, to obtain a powder mixture. To the powder mixture was added 15 parts by weight of water containing 7.5 parts by weight of granulated sugar and 7.5 parts by weight of urea dissolved therein, and the mixture was kneaded sufficiently. The resultant kneaded material was granulated by a compact extrusion granulation machine equipped with a 0.9 mmφ screen, and the particle size was regulated, then, the granules were dried at 60° C. for 15 minutes to obtain an inner core in the form of cylinder (granule size: 1400 to 850 µm, average diameter of cross-section: 0.9 mmφ).

In a rotary bath, 100 parts by weight of the above-mentioned inner core was made into tumbling condition, and the inner core was heated up to about 80° C. by hot air. Next, 0.25 parts by weight of an unhardened urethane resin (F) described in Table 2 was added. The unhardened urethane resin was prepared by mixing the polyol (F) (melted at 50° C.) described in Table 2 with 4,6-tris(dimethylaminomethyl)phenol(catalyst) in advance and adding an aromatic diisocyanate (melted at 50° C.) just before the use. After addition of the unhardened urethane resin, the tumbling condition was kept under heating for 3 minutes or more. Further, addition of the unhardened urethane resin and keeping of the tumbling condition under heating for 3 minutes were repeated until the total amount of the unhardened urethane resin added reached 3.00 parts by weight. Thereafter, the mixture was cooled down to around room temperature, to obtain coated pesticidal granule (F).

Production Example 7

Eight (8) parts by weight of N-(1,1,3-trimethyl-2-oxa-4-indanyl)-5-chloro-1,3-dimethylpyrazole-4-carboxamide, 1.6 parts by weight of hydrous silicon dioxide (TOKUSEAL GU-N, manufactured by Tokuyama Soda Co., Ltd.) and 8 parts by weight of bentonite (BENTONITE FUJI, manufactured by Hojun Kogyo K.K.) were mixed sufficiently, then, pulverized by a jet mill. 17.6 parts by weight of the crushed material obtained above, 4.5 parts by weight of a pulverized mixture of 3.15 parts by weight of [(E)-1-(2-chloro-1,3-thiazol-4-ylmethyl)-3-methyl-2-nitroquanidine] and 1.35 parts by weight of clay (SHOKOSAN Clay S, manufactured by Shokosan Kogyosho K.K.), 3 parts by weight of a mixture of 2.5 parts by weight of polyvinyl alcohol (GOHSENOL GL-05 (manufactured by Nippon Synthetic Chemical Industry Co., Ltd.) and 0.5 parts by weight of PVA 217S (manufactured by Kuraray Co., Ltd.), 12 parts by weight of bentonite (BENTONITE FUJI, manufactured by Hojun Kogyo K.K.), 2 parts by weight of polyoxyethylene styryl phenyl ether (SOLPOL T-20, manufactured by Toho Chemical Industry Co., Ltd.) and 51.9 parts by weight of a calcium carbonate powder (TANCAL NN200, manufactured by Nitto Funka Kogyo K.K.) were mixed sufficiently in a juice mixer, to obtain a powder mixture. To the powder mixture was added 15 parts by weight of water containing 12.0 parts by weight of granulated sugar and 1.5 parts by weight of urea dissolved therein, and the mixture was kneaded sufficiently. The resultant kneaded material was granulated by a compact extrusion granulation machine equipped with a 0.9 mmφ screen, and the particle size was regulated, then, the granules were dried at 60° C. for 15 minutes to obtain an inner core in the form of cylinder (granule size: 1400 to 850 µm, average diameter of cross-section: 0.9 mmφ).

In a rotary bath, 100 parts by weight of the above-mentioned inner core was made into tumbling condition, and the inner core was heated up to about 70° C. by hot air, 4 parts by weight of liquid paraffin was added and kept the tumbling condition for 10 minutes. Next, 0.25 parts by weight of an unhardened urethane resin (E) described in Table 2 was added. The unhardened urethane resin (E) was prepared by mixing the polyol (F) (melted at 50° C.) described in Table 2 with 4,6-tris(dimethylaminomethyl)phenol(catalyst) in advance and adding an aromatic diisocyanate (melted at 50° C.) just before the use. After addition of the unhardened urethane resin, the tumbling condition was kept under heating for 3 minutes or more. Further, addition of the unhardened urethane resin and keeping of the tumbling condition under heating for 3 minutes were repeated until the total amount of the unhardened urethane resin added reached 6.00 parts by weight. Thereafter, the mixture was cooled down to around room temperature, to obtain coated pesticidal granule (E).

Test Example 4

200 mg of the coated pesticidal granules (F) and (E) obtained above was placed in a 100 ml glass tube, 100 ml of ion-exchanged water was added thereto and the mixture was allowed to stand still at 25° C. After given time, a small amount of the mixture was sampled, and the contents of N-(1,1,3-trimethyl-2-oxa-4-indanyl)-5-chloro-1,3-dimethylpyrazole-4-carboxamide and [(E)-1-(2-chloro-1,3-thiazol-4-ylmethyl)-3-methyl-2-nitroquanidine] eluted from the coated pesticidal granules was measured. The elution ratio of N-(1,1,3-trimethyl-2-oxa-4-indanyl)-5-chloro-1,3-dimethylpyrazole-4-carboxamide after one week was 32% for the coated pesticidal granule (F) and 24% for the coated pesticidal granule (E). Further, the elution ratio of [(E)-1-(2-chloro-1,3-thiazol-4-ylmethyl)-3-methyl-2-nitroquanidine] after one week was 59% for the coated pesticidal granule (E).

Industrial Applicability

In the coated granule containing a bioactive substance, a resin forming a coat shows degradability in soil, and there is controllability of suitable elution of the bioactive substance.

The invention claimed is:

1. A coated granule obtained by coating a bioactive substance-containing granule with a urethane resin obtained by reaction of an aromatic diisocyanate with a polyol mixture consisting of a polycaprolactonepolyol and a C2-C8 polymethylene glycol, and an opional additional triol, wherein the molar ratio of the polycaprolactonepolyol to the polymethylene glycol is 1:20 to 20:1.

2. The coated granule according to claim 1, wherein the amount of the polycaprolactonepolyol is 15 to 80 parts by weight based on 100 parts by weight of the total amount of the aromatic diisocyanate and the polyol mixture.

3. The coated granule according to claim 1, wherein the amount of the polycaprolactonepolyol is 20 to 70 parts by weight based on 100 parts by weight of the total amount of the aromatic diisocyanate and the polyol mixture.

4. The coated granule according to claim 1, wherein the amount of the polymethylene glycol is 1 to 25 parts by weight based on 100 parts by weight of the total amount of the aromatic diisocyanate and the polyol mixture.

5. The coated granule according to claim 1, wherein the polymethylene glycol is 1,4-butandiol or 1,6-hexanediol or a mixture thereof.

6. The coated granule according to claim 1, wherein the amount of the aromatic diisocyanate is 10 to 49 parts by weight based on 100 parts by weight of the total amount of the aromatic diisocyanate and the polyol mixture.

7. The coated granule according to claim 1, wherein the aromatic diisocyanate is 4,4'-diphenylmethanediisocyanate.

8. The coated granule according to claim 1, wherein the polyol mixture consists polycaprolactonepolyol, C2-C8 polymethylene glycol and at least one selected from the group consisting of castor oil and hydrogenated castor oil.

9. The coated granule according to claim 8, wherein the amounts of the polycaprolactonepolyol, C2-C8 polymethylene glycol, castor oil and/or hydrogenated castor oil and aromatic diisocyanate are 20 to 55 parts, 1 to 15 parts, 10 to 40 parts and 10 to 49 parts by weight, respectively, based on 100 parts by weight of the total amount of the aromatic diisocyanate and the polyol mixture.

10. The coated granule according to claim 1, wherein the bioactive substance is a fertilizer.

11. The coated granule according to claim 1, wherein the bioactive substance is a pesticide.

12. The coated granule according to claim 1, wherein the polyol mixture includes the optional additional triol, and wherein the optional additional triol is selected from the group consisting of castor oil, hydrogenated castor oil, and mixtures thereof.

13. A coated granule obtained by coating a bioactive substance-containing granule with a urethane resin obtained by reaction of an aromatic diisocyanate with a polyol mixture consisting of a polyesterpolyol and a C2-C8 polymethylene glycol selected from the group consisting of 1,4-butandiol, 1,6-hexanediol and mixtures thereof, and an optional additional triol, wherein the molar ratio of the polyesterpolyol to the polymethylene glycol is 1:20 to 20:1.

14. A coated granule obtained by coating a bioactive substance-containing granule with a urethane resin obtained by reaction of an aromatic diisocyanate with a polyol mixture consisting of a polyesterpolyol and a C2-C8 polymethylene glycol, and an additional triol, wherein the molar ratio of the polyesterpolyol to the polymethylene glycol is 1:20 to 20:1.

15. The coated granule according to claim 14, wherein the additional triol is selected from the group consisting of castor oil, hydrogenated castor oil, and mixtures thereof.

16. A coated granule obtained by coating a bioactive substance-containing granule with a urethane resin obtained by reaction of an aromatic diisocyanate with a polyol mixture consisting of a polyesterdiol, a C2-C8 polymethylene glycol and a triol, wherein the molar ratio of the polyesterdiol to the polymethylene glycol is 1:20 to 20:1.

17. The coated granule according to claim 16, wherein the polyesterdiol has 15 wt% or more of an oxycarbonyl structure (-O-C(=O)—) part in the molecule.

18. The coated granule according to claim 16, wherein the amount of the polyesterdiol is 15 to 80 parts by weight based on 100 parts by weight of the total amount of the aromatic diisocyanate and the polyol mixture.

19. The coated granule according to claim 16, wherein the amount of the polymethylene glycol is 1 to 25 parts by weight based on 100 parts by weight of the total amount of the aromatic diisocyanate and the polyol mixture.

20. The coated granule according to claim 16, wherein the polymethylene glycol is 1,4-butandiol or 1,6-hexanediol or a mixture thereof.

21. The coated granule according to claim 16, wherein the amount of the aromatic diisocyanate is 10 to 49 parts by weight based on 100 parts by weight of the total amount of the aromatic diisocyanate and the polyol mixture.

22. The coated granule according to claim 16, wherein the aromatic diisocyanate is 4,4'-diphenylmethanediisocyanate.

23. The coated granule according to claim 16, wherein the amounts of the polyesterdiol, C2-C8 polymethylene glycol, triol and aromatic diisocyanate are 20 to 55 parts, 1 to 15 parts, 10 to 40 parts and 10 to 49 parts by weight, respectively, based on 100 parts by weight of the total amount of the aromatic diisocyanate and the polyol mixture.

24. The coated granule according to claim 16, wherein the bioactive substance is a fertilizer.

25. The coated granule according to claim 16, wherein the bioactive substance is a pesticide.

* * * * *